United States Patent [19]

Patel et al.

[11] Patent Number: 5,641,195

[45] Date of Patent: Jun. 24, 1997

[54] TRIM COMPONENT HAVING ENERGY ABSORBING FEATURE

[75] Inventors: Rasik N. Patel, Canton; Randy Craig Linn, Livonia, both of Mich.

[73] Assignee: Ford Motor Company, Dearborn, Mich.

[21] Appl. No.: 417,346

[22] Filed: Apr. 5, 1995

[51] Int. Cl.⁶ .................................................. B60R 21/04
[52] U.S. Cl. ........................ 296/189; 296/146.7; 280/751
[58] Field of Search ................................ 296/189, 146.7; 280/748, 751

[56] References Cited

U.S. PATENT DOCUMENTS

| 3,439,769 | 4/1969 | Brilmyer . | |
|---|---|---|---|
| 3,779,595 | 12/1973 | Suzuki et al. | 296/189 X |
| 3,936,090 | 2/1976 | Aya et al. . | |
| 3,964,578 | 6/1976 | Campbell et al. . | |
| 3,989,275 | 11/1976 | Finch et al. | 280/751 |
| 4,089,525 | 5/1978 | Schwanz et al. . | |
| 4,229,036 | 10/1980 | Toda | 296/202 |
| 4,591,204 | 5/1986 | Gallitzendoerfer | 296/202 |
| 4,786,100 | 11/1988 | Kleemann et al. | 296/146.6 |
| 5,163,730 | 11/1992 | Welch | 296/189 |
| 5,433,478 | 7/1995 | Naruse | 280/751 |
| 5,544,933 | 8/1996 | Shahab et al. | 296/189 |

FOREIGN PATENT DOCUMENTS 3026736 of 1980 Germany .

*Primary Examiner*—Joseph D. Pape
*Attorney, Agent, or Firm*—Daniel M. Stock, Esq.; Roger L. May, Esq.

[57] ABSTRACT

A trim component for mounting to a structural member of an automotive vehicle including a body fixedly mounted to a structural member, the body including a plurality of energy absorbing ribs spaced relative to one another along the body and disposed adjacent to the structural member when the trim component is mounted thereto. The energy absorbing ribs include a series of fingers extending from the body and spaced relative to one another. The fingers deflect upon contact with the structural member in response to a force acting on the body to absorb and dissipate the energy generated by the force.

14 Claims, 2 Drawing Sheets

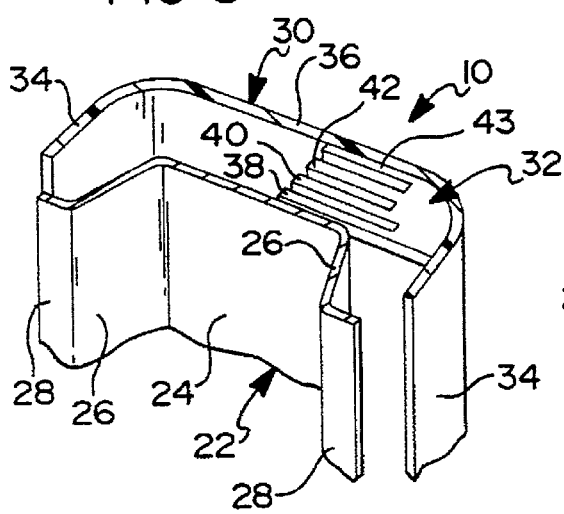
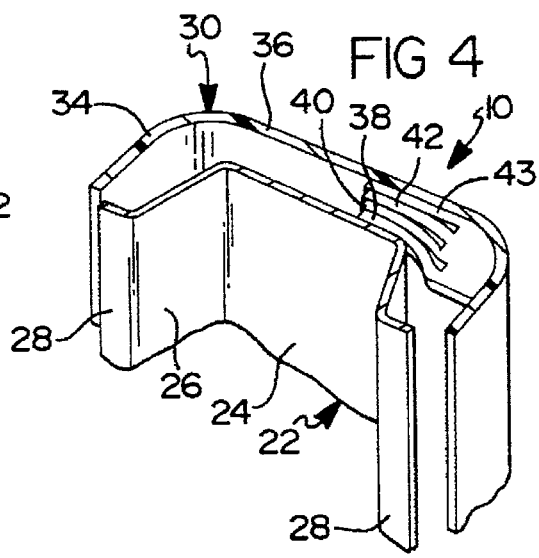
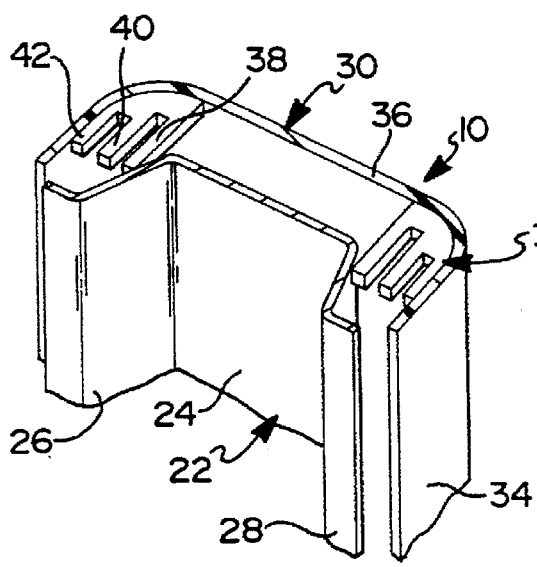
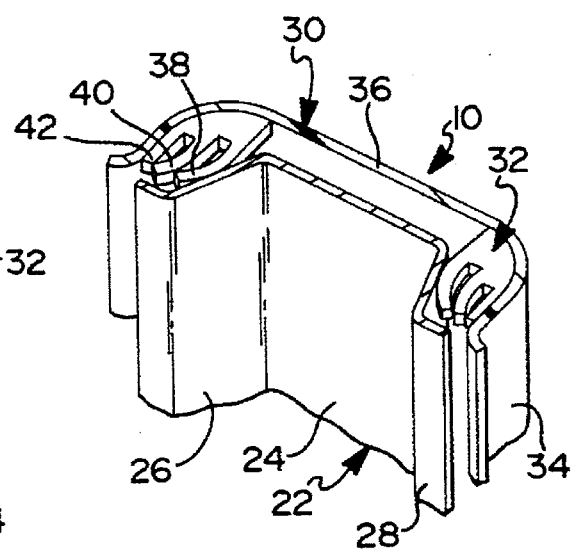

5,641,195

TRIM COMPONENT HAVING ENERGY ABSORBING FEATURE

BACKGROUND OF THE INVENTION

1. Field of the Invention

The present invention relates generally to trim components and, more specifically, to automotive trim components having energy absorbing features.

2. Description of the Related Art

Trim components are used in automotive applications to present an aesthetically pleasing appearance in the interior of the vehicle, to smooth contours and to cover structural load bearing components of the vehicle. For example, trim components are employed for these purposes in connection with the A, B, C, and D pillars of the vehicle, the side rails as well as the roof rails or the front and rear headers.

In addition to the asthetic purposes of such trim components, they also absorb energy in the event of an impact or collision. Thus, there is a need in the art for trim components havign enhanced energy absorbing capabilities which also meet the design objectives identified above without sacrificing the interior space of the vehicle.

SUMMARY OF THE INVENTION

The present invention overcomes the above disadvantages of trim components in automotive vehicles. More specifically, the present invention is directed toward a trim component for mounting to a structural member of an automotive vehicle including a body fixedly mounted to the structural member. The body includes a plurality of energy absorbing ribs spaced relative to one another along the body and disposed adjacent to the structural member when the trim component is mounted thereto. The energy absorbing ribs include at least one cantilevered finger extending from the body and disposed adjacent to the structural member of a vehicle. The finger deflects upon contact with the structural member in response to a force acting on the body to absorb and dissipate the energy generated by the force.

The present invention may be employed in connection with all interior trim components and especially in connection with upper trim components such as the A, B, C and D pillars as well as side and roof rails. Furthermore, the present invention meets those objectives without sacrificing the interior space of the vehicle.

Other features and advantages of the present invention will be readily appreciated as the same becomes better understood after reading the subsequent description when considered in connection with the accompanying drawings.

BRIEF DESCRIPTION OF THE DRAWINGS

FIG. 3 is a partial perspective view illustrating the trim component of the present invention mounted to a structural member in cross-section;

FIG. 4 is a partial perspective view illustrating the trim component of the present invention mounted to a structural member in cross-section during the course of an impact;

FIG. 5 is a partial perspective view illustrating the trim component of the present invention mounted to a structural member in cross-section; and FIG. 6 is a partial perspective view illustrating the trim component of the present invention mounted to a structural member in cross-section during the course of an impact.

DESCRIPTION OF THE PREFERRED EMBODIMENT(S)

Figure 1:
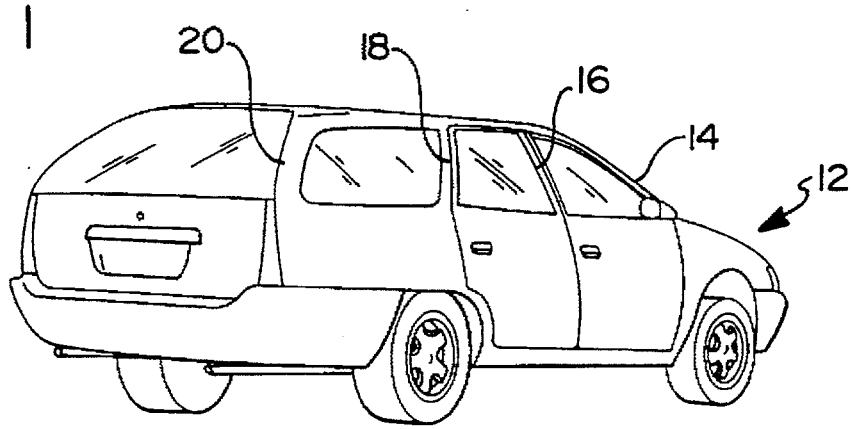
FIG. 1 is a perspective view of an automotive vehicle.
Figure 2:
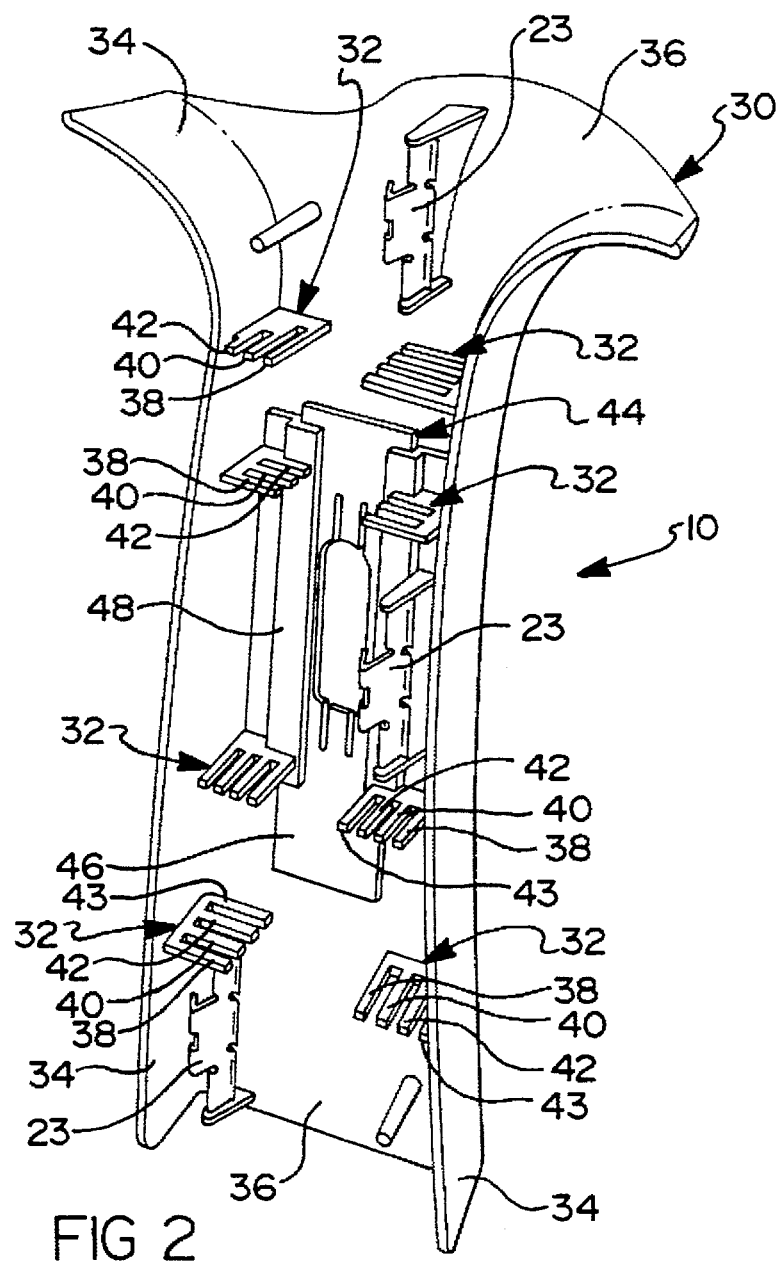
FIG. 2 is a perspective view of the trim component of the present invention illustrating the inner face thereof.

The present invention is directed toward an energy absorbing trim component, generally shown at 10 in FIG. 2. Trim components 10 are often employed in connection with structural components on automotive vehicles, one example of which is illustrated at 12 in FIG. 1. The structural components often associated with interior trim components may include A, B, C and D pillars shown at 14, 16, 18 and 20, respectively in FIG. 1 as well as side and roof rails (not shown). It will be appreciated, however, that the trim component 10 of the present invention may be employed at many locations in a vehicle to present an aesthetically pleasing appearance in the interior of the vehicle, to smooth contours and to cover structural load bearing components of the vehicle.

For illustration purposes, in FIGS. 3 through 6, the trim component 10 of the present invention is shown mounted to a structural, load bearing member 22 of the vehicle 12. The load bearing member 22 may be any of the pillars or side and roof rails mentioned above. Such structural load bearing members are typically fabricated from sheet metal components. As shown in FIGS. 3 through 6, the structural load bearing members 22 may include a central elongated planar member 24 with a pair of side members 26 extending therefrom. The side members 26 may terminate in peripheral flanges 28. However, it should be appreciated that the structural member 22 of the vehicle 12 may take on any configuration dictated by the application. Similarly, the trim component 10 of the present invention is configured in a manner to properly cover the structural member 22 in an aesthetically pleasing, efficient manner and therefore may also take many shapes.

More specifically and referring now to FIG. 2, the trim component 10 includes a body, generally indicated at 30. The body 30 is adapted to be fixedly mounted to the structural member 22 using any suitable means. Such means may include the clips 23 located near the top and bottom of the body 30 as illustrated in FIG. 2. The body 30 also includes a plurality of energy absorbing ribs, generally indicated at 32, spaced relative to one another along the body 30 and disposed adjacent to the structural member 22 when the trim component 10 is mounted thereto. The body 30 conforms to the structural member 22 to be covered by the trim component 10 and in the example shown here is substantially U-shaped in cross-section and includes a pair of edges 34 and a substantially planar expanse 36 extending between the pair of edges 34. The pair of edges 34 extend substantially perpendicular to the planar expanse 36 and toward the structural member 22 of the vehicle. However, it should be appreciated that the edges 34 may extend at any angle relative to the planar expanse 36 necessary to carry out the purpose of the trim component 10. The body 30 is a one piece, plastic, injection molded part having a plurality of energy absorbing ribs 32 molded integrally thereto. The ribs 32 may be strategically placed on the internal surface of the planar expanse 36 and sides 34 of the body, facing the structural member 22. In the event of an impact, energy may be effectively absorbed as discussed in greater detail below. The side of the body 30 opposite the structural member 22 may also be covered or wrapped in vinyl, cloth, leather or any other material suitable for the purpose.

The energy absorbing ribs 32 include at least one finger extending in cantilevered fashion from the body 30. The ribs 32 deflect upon contact with the structural member 22 in response to a force acting on the body 30 to absorb and dissipate the energy generated by the force. More specifically, the energy absorbing ribs 32 include a series of flexible plastic fingers 38, 40, 42, disposed parallel relative to one another and spaced relative to one another. The fingers 38, 40, 42 deflect one after another in response to a force acting on the body 30. The fingers include a primary member 38 located directly adjacent the structural component 22, a secondary member 40 spaced from the primary member 38 and a third member 42 also spaced from the secondary member 40 such that the fingers 38, 40, 42 deflect in series in response to a force acting on the body. It should be appreciated that the ribs may include additional fingers 43 depending on space requirements and other considerations.

As illustrated in FIGS. 2 and 3 the series of fingers 38, 40, 42, 43 may extend perpendicular to the pair of edges 34 and substantially parallel to the planar expanse 36 of the body. Alternatively, and as shown in FIGS. 2 and 5, the series of fingers 38, 40, 42, 43 may also extend perpendicular to the planar expanse 36 and substantially parallel to the pair of edges 34.

In addition, it is not uncommon for a secondary structural member, generally indicated at 44 in FIG. 2, to be mounted to or otherwise be attached to a trim component. For example, in this Figure the trim component includes a D-ring panel 46 which is slideably mounted to the body 30 via the channel member 48. The D-ring panel 46 may be employed to accommodate the motion of a D-ring (not shown) which is part of a passenger restraint system such as a seat belt. Such passenger restraint components are often mounted to the structural member 22 which, in turn, have trim components 10. In these cases, the secondary structural component 44 may include a plurality of energy absorbing ribs 32 spaced relative to one another along the secondary support member 44 and disposed adjacent to the structural member when the trim component is mounted thereto. As with the ribs 32 molded directly to the body 30 of the trim component, the energy absorbing ribs 32 of the secondary structural component 44 include a series of fingers 38, 40, 42, 43 extending from the secondary support structure 44 and spaced relative to one another. Similarly, the fingers 38, 40 and 42, 43 of the secondary structural component deflect upon contact with the structural member 22 in response to a force acting on the body to absorb and dissipate the energy generated by the force.

The ribs 32 may be located at multiple places along the body 30 and may also serve to locate the trim component 10 relative to the support structure 22. In the event of an impact force acting on the trim component 10, the series of fingers 38, 40, 42, 43 of the ribs 32 will be consecutively engaged as the body 32 is forced toward the structural member 22. Specifically, in response to a force, the primary member 38 will first be engaged, bending toward the secondary member 40. If the force is great enough, the secondary member 40 will then also be engaged as will the third member 42 and any additional member 43 thereafter. In this way, the resistance to the force acting on the trim component and the energy absorbed increases as a function of the force acting thereon. It should be appreciated, however, that the ribs 32 may all comprise either a single cantilevered finger or a plurality of fingers extending from the body 30. These objectives and advantages are achieved in an aesthetically pleasing trim component 10 without sacrificing the interior compartment space of the vehicle.

The present invention has been described in an illustrative manner, and it is to be understood that the terminology which has been used is intended to be in the nature of words of description rather than of limitation. Many modifications and variations of the present invention are possible in light of the above teachings. It is, therefore, to be understood that within the scope of the appended claims the present invention may be practiced otherwise than as specifically described.

What is claimed is:

1. A trim component for mounting to a structural member of an automotive vehicle, said trim component comprising:

a body fixedly mounted to the structural member, said body including a pair of edges and a substantially planar expanse extending between said pair of edges, said pair of edges extending substantially perpendicular to said planar expanse and toward the structural member of the vehicle, said body further including a plurality of energy absorbing ribs spaced relative to one another along said body and disposed adjacent to the structural member when said trim component is mounted thereto;

said energy absorbing ribs including at least one finger extending in cantilevered fashion from said body and perpendicular to said pair of edges and substantially parallel to said planar expanse and deflecting upon contact with the structural member in response to a force acting on said body to absorb and dissipate the energy generated by the force.

2. A trim component as set forth in claim 1 wherein said energy absorbing ribs include a series of fingers disposed parallel relative to one another and deflecting one after another in response to a force acting on said body.

3. A trim component as set forth in claim 2 wherein said fingers include at least a primary member located directly adjacent the structural component, at least a secondary member spaced from said primary member and at least a third member spaced from said secondary member such that said fingers deflect in series in response to a force acting on said body.

4. A trim component as set forth is in claim 1 wherein said at least one finger extends perpendicular to said planar expanse and substantially parallel to said pair of edges.

5. A trim component as set forth in claim 1 wherein said ribs are formed of flexible plastic.

6. A trim component as set forth in claim 1 wherein said body is a one-piece, plastic injection molded part said plurality of energy absorbing ribs molded integrally thereto.

7. A trim component for mounting to a structural member of an automotive vehicle, said trim component comprising:

a body fixedly mounted to the structural member, said body including a pair of edges and a substantially planar expanse extending between said pair of edges, said pair of edges extending substantially perpendicular to said planar expanse and toward the structural member of the vehicle, said body further including a plurality of energy absorbing ribs spaced relative to one another along said body and disposed adjacent to the structural member when said trim component is mounted thereto;

said energy absorbing ribs including a series of fingers spaced relative to one another and extending from said body perpendicular to said pair of edges and substantially parallel to said planar expanse, said fingers deflecting upon contact with the structural member is in response to a force acting on said body to absorb and dissipate the energy generated by the force.

8. A trim component as set forth in claim 7 wherein said fingers include at least a primary member located directly adjacent the structural component, at least a secondary member spaced from said primary member and at least a third member spaced from said secondary member such that said fingers deflect in series in response to a force acting on said body.

9. A trim component as set forth in claim 7 wherein said series of fingers are disposed parallel relative to one another and deflecting one after another in response to a force acting on said body.

10. A trim component as set forth in claim 7 wherein said series of fingers extend perpendicular to said planar expanse and substantially parallel to said pair of edges.

11. A trim component for mounting to a structural member of an automotive vehicle, said trim component comprising;

a body fixedly mounted to the structural member of the vehicle, said body including a pair of edges and a substantially planar expanse extending between said pair of edges, said pair of edges extending substantially perpendicular to said planar expanse and toward the structural member of the vehicle, said body further including a secondary structural member mounted thereto for supporting another component of the vehicle, said secondary structural component including a plurality of energy absorbing ribs spaced relative to one another along said secondary support member and disposed adjacent to the structural member when the trim component is mounted thereto, said energy absorbing ribs including a series of fingers spaced relative to one another and extending from said secondary support structure perpendicular to said pair of edges and substantially parallel to said planar expanse, said fingers deflecting upon contact with the structural member is in response to force acting on said body to absorb and dissipate the energy generated by the force.

12. A trim component as set forth in claim 11 wherein said fingers include at least a primary member located directly adjacent the structural component, at least a secondary member spaced from said primary member and at least a third member spaced from said secondary member such that said fingers deflect in series in response to a force acting on said body.

13. A trim component as set forth in claim 11 wherein said series of fingers are disposed parallel relative to one another and deflecting one after another in response to a force acting on said body.

14. A trim component as set forth in claim 11 wherein said series of fingers extend perpendicular to said planar expanse and substantially parallel to said pair of edges.

* * * * *